(No Model.)
G. & E. SMITH & N. SMITH, Jr.
MEANS FOR SECURING PULLEYS TO SHAFTS.
No. 353,329. Patented Nov. 30, 1886.
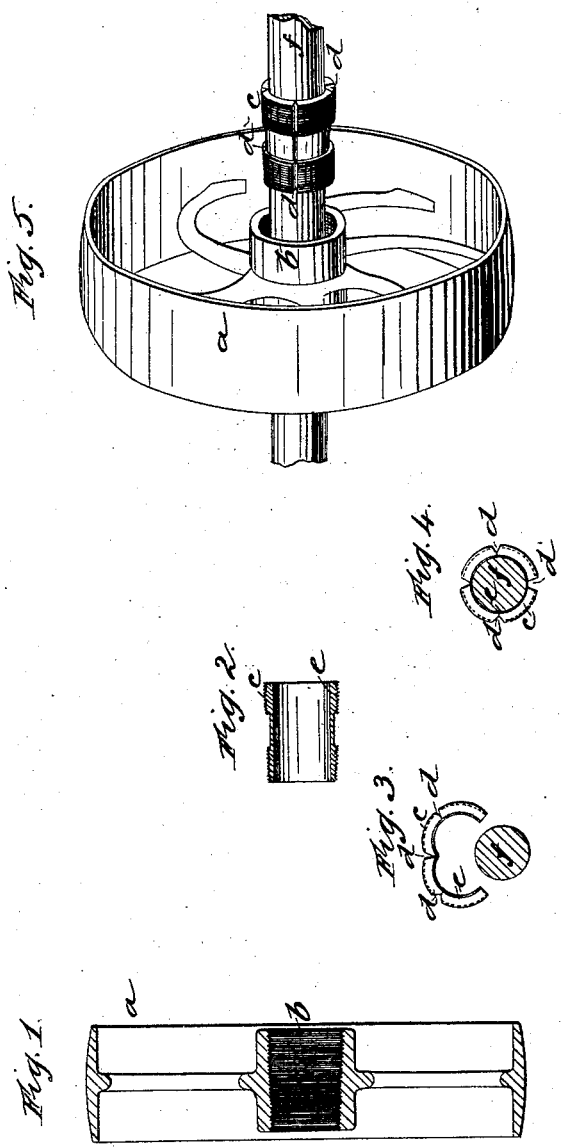
Witnesses.
Will T. Norton
Josiah Bedon
Inventors.
George Smith, Edwin Smith
and Nathaniel Smith Jr.
by their Atty's John J. Halsted & Son

UNITED STATES PATENT OFFICE.

GEORGE SMITH, EDWIN SMITH, AND NATHANIEL SMITH, JR., OF THRAPSTON, COUNTY OF NORTHAMPTON, ENGLAND.

MEANS FOR SECURING PULLEYS TO SHAFTS.

SPECIFICATION forming part of Letters Patent No. 353,329, dated November 30, 1886.

Application filed July 26, 1886. Serial No. 209,084. (No model.) Patented in England March 13, 1885, No. 3,290.

*To all whom it may concern:*

Be it known that we, GEORGE SMITH, EDWIN SMITH, and NATHANIEL SMITH, the younger, subjects of the Queen of Great Britain, residing at Thrapston, in the county of Northampton, England, have invented new and useful Improvements in Means for Securing Pulleys or Wheels to Shafts, of which the following is a specification.

The object of this invention is to provide simple means for applying and fixing pulleys, riggers, disks, or wheels securely to shafting and spindles.

In carrying out the invention we bore the center hole of the pulleys, riggers, disks, or wheels conical, and screw the said holes internally with either a V or a square thread. We provide a bush or socket turned and screwed externally and adapted to fit into the hole in the pulley, rigger, disk, or wheel. The said bush or socket is bored internally and split on one or more sides.

In order that our invention may be fully understood, we will describe the same by reference to the accompanying drawings, in which—

Figure 1 is a section of a pulley having a conical and screw-threaded center hole according to our invention. Fig. 2 is a longitudinal section of the screw bush or socket. Fig. 3 is an end view of the bush or socket in position ready to be placed on a shaft, which is represented in cross-section. Fig. 4 is a similar view to Fig. 3, but showing the bush or socket placed on the shaft. Fig. 5 is a perspective view showing a shaft with the bush or socket thereon, and the pulley in position to be passed onto the same.

Similar letters in all the figures represent similar parts.

*a* is an ordinary pulley, the center hole, *b*, of which is bored conical, and is provided internally with a screw-thread, as shown in Fig. 1.

*c* is the bush or socket turned conical and screw-threaded externally, as shown in Fig. 2, and adapted to screw into the hole *b* in the pulley *a*, the brush or socket *c* being bored internally.

*d d d d* show the places at which the sides of the bush or socket are divided.

*e* is a lining in the interior of the bush or socket *c*, which lining is formed of suitable material—such as emery-cloth—riveted or otherwise suitably attached to the parts of the bush *c*, and serving to connect together the segments of the bush or socket, so as to allow them to be opened, as shown in Fig. 3. The said lining also serves to prevent the bush or socket from slipping or turning on the shaft *f* when screwed into the center hole, *b*, of the pulley *a*.

To secure a pulley (or a rigger, disk, or wheel) to a shaft by these improved means, it is simply necessary, the pulley *a* being placed upon the shaft *f*, as in Fig. 5, to open the divided and screw-threaded bush or socket *c*, as shown in Fig. 3, when it can be placed on the shaft *f*, as shown in Figs. 4 and 5, and the pulley *a* being rotated so as to screw its conical center hole, *b*, over the conical bush or socket *c*, the latter will be caused to firmly grip the shaft *f*, and the pulley *a* will be securely fixed on the bush or socket *c*. By this arrangement it will be obvious that a pulley or wheel can be adapted to and fixed on shafts or spindles of different diameters by employing a suitably-sized bush.

Having now particularly described and ascertained the nature of our said invention and in what manner the same is to be performed, we declare that what we claim is—

1. The combination, with a pulley or wheel having a conical and screw-threaded center hole, of a hollow divided bush or socket having a flexible lining and adapted to screw into the said center hole of the pulley or the like, substantially as and for the purpose hereinbefore described, and represented in the accompanying drawings.

2. A divided hollow bush or socket, such as *c*, screw-threaded on its exterior, and having a lining, *e*, of suitable material, substantially as and for the purposes hereinbefore described, and represented in the accompanying drawings.

GEORGE SMITH.
EDWIN SMITH.
NATHANIEL SMITH, JR.

Witness as to signature of George Smith:
JOSEPH HAWKINS MASON,
*Artist, Thrapston.*

Witnesses as to signature of Edwin Smith:
F. W. PRICE,
B. BRADY.

Witness as to signature of Nathaniel Smith, Jr:
ALFRED SMITH,
*Engineer, Thrapston.*